United States Patent
French et al.

(10) Patent No.: US 11,135,509 B2
(45) Date of Patent: Oct. 5, 2021

(54) SYSTEMS AND METHODS OF DIRECTING REMOTE PLAYER INTERACTIONS

(71) Applicant: Microsoft Technology Licensing, LLC, Redmond, WA (US)

(72) Inventors: Tom Whitcomb French, Kirkland, WA (US); Andrew John Witts, Issaquah, WA (US); Fernando Reyes Medina, Redmond, WA (US); Patrick Michael Wren, Issaquah, WA (US); Zachary William Boyce, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/785,295

(22) Filed: Feb. 7, 2020

(65) Prior Publication Data

US 2021/0245044 A1    Aug. 12, 2021

(51) Int. Cl.
 *A63F 13/35* (2014.01)
(52) U.S. Cl.
 CPC .................... *A63F 13/35* (2014.09)
(58) Field of Classification Search
 None
 See application file for complete search history.

(56) References Cited

U.S. PATENT DOCUMENTS

| 9,566,513 B2* | 2/2017 | Lam | A63F 13/75 |
| 10,135,943 B2* | 11/2018 | Palandurkar | A63F 13/533 |
| 10,864,433 B2* | 12/2020 | Zhu | A63F 13/92 |
| 2009/0280908 A1 | 11/2009 | Carroll et al. | |
| 2013/0190096 A1* | 7/2013 | Ronen | A63F 13/497 463/43 |
| 2015/0111642 A1 | 4/2015 | Lawson | |
| 2016/0332073 A1 | 11/2016 | Marr et al. | |
| 2019/0091517 A1* | 3/2019 | Inoue | C09D 175/08 |

OTHER PUBLICATIONS

"How Does the Team v. Team Domination Mode Work?", Retrieved From: http://www.ghostrecon.net/faqs/index.php?sid=1192038&lang=en&action=artikel&cat=10&id=56&artlang=en, Retrieved on: Nov. 26, 2019, 2 Pages.

(Continued)

*Primary Examiner* — Ronald Laneau
(74) *Attorney, Agent, or Firm* — Ray Quinney & Nebeker P.C.; John O. Carpenter (57) ABSTRACT

A method of providing gameplay experiences for users includes communicating with a plurality of game clients via a network, where each of the game clients is running a game application. The method further includes identifying a plurality of users of the game applications on the game clients, assigning each of the users to a team in a game instance, and assigning the users to one of a plurality of squads on the team. The method continues by initiating an activity mode in the game instance, where the activity mode includes assigning a different activity to each of the squads and tracking progress toward completion of each activity by users of the assigned squad. Upon satisfaction of the completion criteria of the activity mode, the method ends the activity mode and initiates an objective mode. The objective mode includes assigning an objective to the team.

20 Claims, 4 Drawing Sheets

(56) References Cited

OTHER PUBLICATIONS

"The Infantry Tactical Training Manual", Retrieved From: http://www.danieljameswarburton.com/uploads/6/9/7/2/6972308/tg_infantry_training_manual_level_1.pdf, Retrieved on: Nov. 26, 2019, 26 Pages.
Andrei, Cernescu, "Galaxy Heist is a Space-Based Online FPS Powered by Unreal Engine 4", Retrieved From: https://web.archive.org/web/20150731023912/https:/www.eteknix.com/galaxy-heist-space-based-online-fps-powered-unreal-engine-4/, Jul. 31, 2015, 3 Pages.
Esbin, Howard B.., "Virtual Teams: On Creating Trust Creatively", In Whitepaper, Sep. 2015, 14 Pages.
Waveren, Van J.M.P.., "The Quake III Arena Bot", Retrieved From: http://citeseerx.ist.psu.edu/viewdoc/download?doi=10.1.1.175.1230&rep=rep1&type=pdf, Jun. 28, 2001, 118 Pages.
"International Search Report & Written Opinion issued in PCT Application No. PCT/US21/014032", dated Apr. 13, 2021, 11 Pages.

\* cited by examiner

SYSTEMS AND METHODS OF DIRECTING REMOTE PLAYER INTERACTIONS

BACKGROUND

Background and Relevant Art

Online gaming has become a standard of the computer game industry. The ability to play against other humans over a network allows greater freedom and creativity in the user's experience with the game. All types of games are played online, and even conventionally single-player action games are introducing spectating or assistance mechanics to enable greater player engagement online.

Large scale multiplayer games, however, can produce disparate experienced for users as the team size becomes large. In large scale events, less experienced or skilled users can become disengaged or uninterested as their contributions lack an identifiable impact on the game environment.

BRIEF SUMMARY

In some embodiments, creating a gameplay session with a gameplay cycle that allows for large scale encounters intermixed with small scale activities keeps users engaged and allows all users to contribute towards an objective. The gameplay cycle may provide users with player versus environment (PvE) challenges, player versus player (PvP) challenges, or combinations thereof.

A method of providing gameplay experiences for users includes communicating with a plurality of game clients via a network, where each of the game clients is running a game application and providing a game instance in data communication with each of the game applications. The method further includes identifying a plurality of users of the game applications on the game clients, assigning each of the users to a team in the game instance, and assigning the users to one of a plurality of squads on the team. The method continues by initiating an activity mode in the game instance, where the activity mode includes assigning a different activity to each of the squads and tracking progress toward completion of each activity by users of the assigned squad. Upon satisfaction of the completion criteria of the activity mode, the method ends the activity mode and initiates an objective mode. The objective mode includes assigning an objective to the team, wherein all of the squads on the team are able to contribute toward completion of the objective, and tracking progress toward completion of the objective by users of the team.

In some embodiments, the method further includes a second activity mode after the first objective mode. The activities of each round may be predetermined or adaptive to customize or vary the gameplay experience to provide engagement and balance to the user experience. The method may continue to iterate between the activity mode and the objective mode until a team is victorious.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

The present disclosure relates generally to systems and methods for directing and providing gameplay experiences for a user. Online multiplayer gaming is common for network-connected personal computers, video game consoles, and even mobile electronic devices. Engaging players of a variety of skill levels with interesting and exciting gameplay modes and experiences provides greater value to the game for both new and experienced users.

Conventional multiplayer gameplay modes can place users against one another in player-versus-player (PvP) competitions or against a computer controlled or scripted threat in player-versus-environment (PvE) challenges. For example, a PvP mode pits users against one another in either team-based competitions or in a free-for-all condition. The users then compete against one another to complete victory conditions or to defeat the opposing users. In PvE challenges, the users are pitted against one or more non-player characters (NPCs) or non-player-controlled elements of the game environment to challenge the users without directly competing against other users.

The users interact with the game environments by either controlling an avatar in the game environment or issuing commands to one or more NPCs that carry out the commands through logic of the game application. In online multiplayer games, such as a first person shooter (FPS), role-playing game (RPG), or massively-multiplayer online RPG (MMORPG), users will frequently play the same multiplayer game modes many times to improve skills or to experience emergent gameplay as user-controlled opponents and teammates both contribute to dynamic and unpredictable gameplay experiences.

Providing new and exciting gameplay modes, therefore, can encourage new users to play a game application and retain users once they have played the gameplay mode. Conventional multiplayer gameplay modes are limited by the structure of the victory conditions of the modes, however. For example, in a large-scale team-based FPS (such as the BATTLEFIELD series of ELECTRONIC ARTS), some users may contribute little or nothing toward the victory condition while other users complete the objective(s) for the team. In other examples, a single objective for the game mode can render the experience repetitive and/or uninteresting to a user as a user will have the same objective and/or challenge despite 64 users or more being assigned to each team.

In some embodiments, a multiplayer gameplay mode according to the present disclosure allows each user to experience a plurality of objectives during a single session of the mode. The variety of objectives can introduce new users to a broader variety of gameplay mechanics and better introduce the new users to gameplay features. The variety of objectives can also challenge experienced users as different tactics, map knowledge, mechanical skills, or in-game configurations (role selection, resource management, item or ability loadouts, etc.) may be necessary to optimally complete the different objectives.

In some embodiments, a multiplayer gameplay mode according to the present disclosure allows each user to contribute tangibly to the completion of at least one objectives during each round or session of the mode. Having tangible or identifiable contributions to the team's progress can engage or excite new users and allow the new users to feel relevant to the team. Meanwhile, having tangible or identifiable contributions to the team's progress can allow experienced users to better hone their skills, efficiency, or tactics in discrete challenges throughout a gameplay mode session.

In some embodiments, a multiplayer gameplay mode according to the present disclosure includes at least two phases to a gameplay session: an activity mode and an objective mode. Each user is placed into one of a plurality of squads on a team. During the activity mode, each squad is assigned a different activity to complete or perform. Upon a sufficient number of activities completed (or a total percentage of the activities completed or performed), the gameplay session transitions to the objective mode. During the objective mode, the squads of the team work cooperatively toward the completion of the team objective. Completion of the team objective may win the gameplay session.

The gameplay cycle between the activity mode and the objective mode may occur more than once in a gameplay session. In some embodiments, the gameplay session remains in the objective mode for a predetermined period of time. Upon the period of time lapsing, the gameplay session reverts to the activity mode irrespective of the progress toward completion of the objective. For example, the team may have five minutes to delivery as many resources to a sieged city as possible. In some embodiments, the objective mode grants a predetermined number of attempts for the team to complete or make progress toward completion of the objective. For example, during the objective mode, the team may be tasked with locating a bomb in a building, but the team as a whole may have only three attempts to defuse the bomb when found without the opponent interfering. Upon exhaustion of the attempts, the gameplay session reverts to the activity mode.

In some embodiments, the gameplay mode is a PvE mode. For example, a team of users may compete against NPCs or computer-controlled environmental challenges. In some embodiments, the gameplay mode is a PvP mode. In some examples, a first team of users may compete directly against a second team of users, such as in a FPS that places users from opposing teams on a shared battlefield. In other examples, a first team of users may compete indirectly against a second team of users, such as in an RPG that places users from opposing teams in a race to complete objectives without directly interacting with one another.

In some embodiments, the activity mode is a PvE mode and the objective mode is a PvP mode, or vice versa. For example, the activity mode may assign PvE activities to each squad of each team. Upon completion of all of the assigned PvE activities by the first team, the first team may have an opportunity to attack the second team's base in direct PvP competition during the objective mode, placing the second team in the defender role for the objective mode. In another example, the activity mode may include a plurality of squad-based direct PvP skirmishes between squads of the first team and squads of the second team. Upon winning a majority of the skirmishes, the first team may be assigned a PvE objective in the objective mode to collect as many resources from a supply ship as possible in a set time, while the second team is assigned a PvE objective during the objective mode to repair or upgrade their base as much as possible. In at least one example, the repaired or upgraded base may provide an advantage in the subsequent activity mode when the objective mode lapses and the gameplay session returns to the activity mode. In this manner, the team that wins the activity mode is permitted an opportunity during the objective mode to progress toward ultimate victory, while the team that loses the activity mode is given an opportunity during the objective mode to improve their chances to win the subsequent activity mode.

Figure 1:
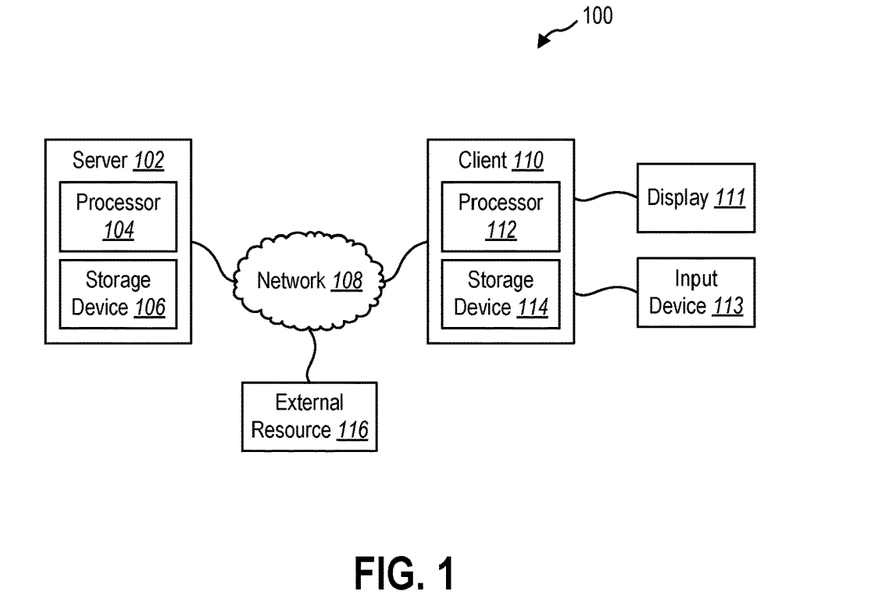
FIG. 1 is a system diagram of a platform system for online gaming, according to at least some embodiments of the present disclosure.

FIG. 1 is a schematic representation of a platform system 100 for directing and providing gameplay experiences for a user. The online platform is hosted on a server 102 including a server processor 104 and a server hardware storage device 106. The server processor 104 is in data communication with the server hardware storage device 106, and the server hardware storage device 106 can include instructions stored thereon that, when executed by the server processor 104, cause the server processor 104 to perform one or more of the methods described herein. A hardware storage device includes any non-transient storage mechanism, such as solid stage storage, platen-based storage, optical disc-based storage or other storage mechanisms.

The server 102 is in data communication with a network 108. The network 108 allows communication with one or more clients 110 including client processors 112 configured to run game applications. The game applications may be stored on a client hardware storage device 114 of the client 110, which is in data communication with the client processor 112. The game application includes visual information presented to the user on a display 111, such as a television, desktop computer display, laptop display, tablet computer display, smartphone display, head-mounted display, or other graphical display. The client 110 is further in communication with an input device 113 that allows the user to provide input commands to the client 110 to interact with the game application.

The network 108 may further provide communication with third-party or other external resources 116. The server 102 and/or the client 110 may communicate with the external resources 116. In some examples, the external resources 116 can include third party databases, social media information, affiliate user profiles or contact lists, game updates, game content updates, etc.

Figure 2:
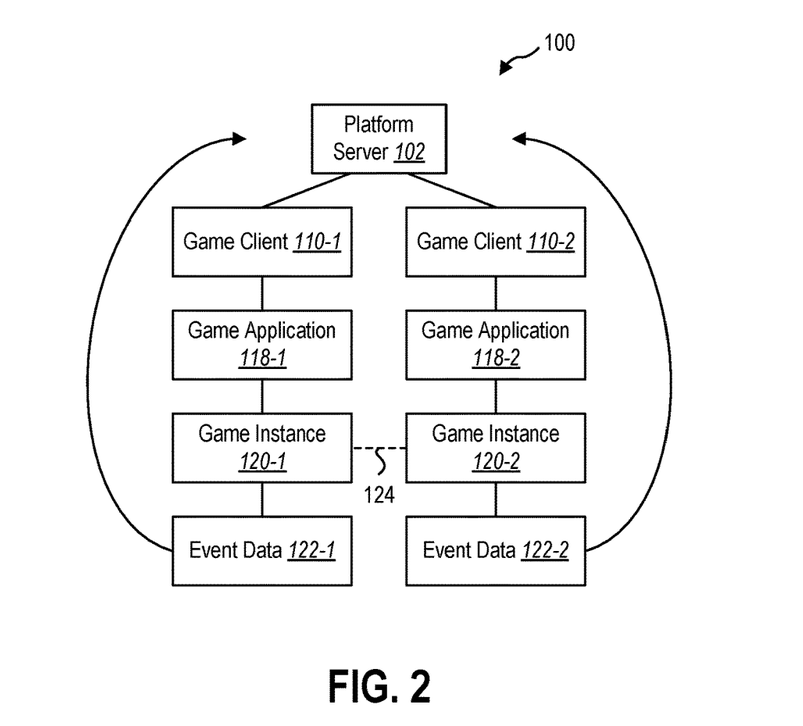
FIG. 2 is a schematic hierarchy of the platform system showing communication through the platform, according to at least some embodiments of the present disclosure.

FIG. 2-1 is a hierarchical diagram illustrating the structure of the online platform system 100. The platform server 102 is in data communication with a plurality of clients, such as the first game client 110-1 and second game client 110-2. For example, the platform server 102 may be part of a video game or social network platform (i.e., MICROSOFT XBOX LIVE, NINTENDO CONNECT, SONY PLAYSTATION NETWORK, GOOGLE STADIA, APPLE ARCADE, VALVE STEAM, TWITCH, ELECTRONIC ARTS ORIGIN) or an application specific platform. Each of the game clients 110-1, 110-2 has a processor and hardware storage device (as described in relation to FIG. 1) that allows the game clients 110-1, 110-2 to run a game application 118-1, 118-2. The game application 118-1, 118-2 is in communication with the platform server 102 through the clients 110-1, 110-2.

In some embodiments, the game clients 110-1, 110-2 are local to the users. For example, the first game client 110-1 may be local to a first user and the second game client 110-2 may be local to a second user, while the platform server 102 is remote to both the first user and second user. In other embodiments, the game clients 110-1, 110-2 are remote from the users. For example, the game clients 110-1, 110-2 may be in data communication via a network to a display and/or input device of the users. In at least one example, the users may engage with the game clients through a cloud networking service, as will be described in more detail below.

Each game application 118-1, 118-2 creates a game instance 120-1, 120-2. For example, a first game instance 120-1, 120-2 can be within a shared open world coordinated on the platform server 102 in which a first user controls a first player character through which the first user interacts with the shared open world, while the second game instance 120-2 allows the second user to control a second player character through which the second user interacts with the shared open world. The shared open world may allow the first user and second user to engage cooperatively or competitively in a world event in the shared open world. For example, a world event may be trigger by a user or may be initiated based on a timer or schedule that allows any players in the local region of the game environment to join in the world event.

In another example, a first game instance 120-1, 120-2 can be a shared event (such as a dungeon, raid, mission, race, sports event, etc.), with only a subset of players in communication with the platform server 102 included in the shared event. Within the shared event, the first game instance 120-1 allows first user to control a first player character, while the second game instance 120-2 allows the second user to control a second player character. In at least one example, the game instances 120-1, 120-2 may be a subset of an open world experience. For example, the game application 118-1, 118-2 may be an open world game while, the game instances 120-1, 120-2 may include only a subregion of the in-game open world, providing a limited experience to only certain player characters.

In some embodiments, the game instances 120-1, 120-2 are synchronized through the platform server 102. For example, the platform server 102 receives game state information from the first game client 110-1 regarding the first game instance 120-1 and transmits the game state information from the first game client 110-1 to the second game client 110-2, such that the actions of the first user are represented in the second game instance 120-2. The platform server 102 can, thereby, coordinate the interactions of many users with a large in-game environment.

In other embodiments, the game instances 120-1, 120-2 are synchronized in a direct connection 124. In some embodiments, the game clients 110-1, 110-2 may be in communication with one another through a network independently of the platform server 102 (such as a direct peer-to-peer connection or a private server) that allows the game instances 120-1, 120-2 to shared state information without limitations of other processing load or network traffic through the platform server 102. For example, a real time strategy game that includes the first user playing against the second user exclusively may benefit from a direct connection 124 through a network.

Figure 3:
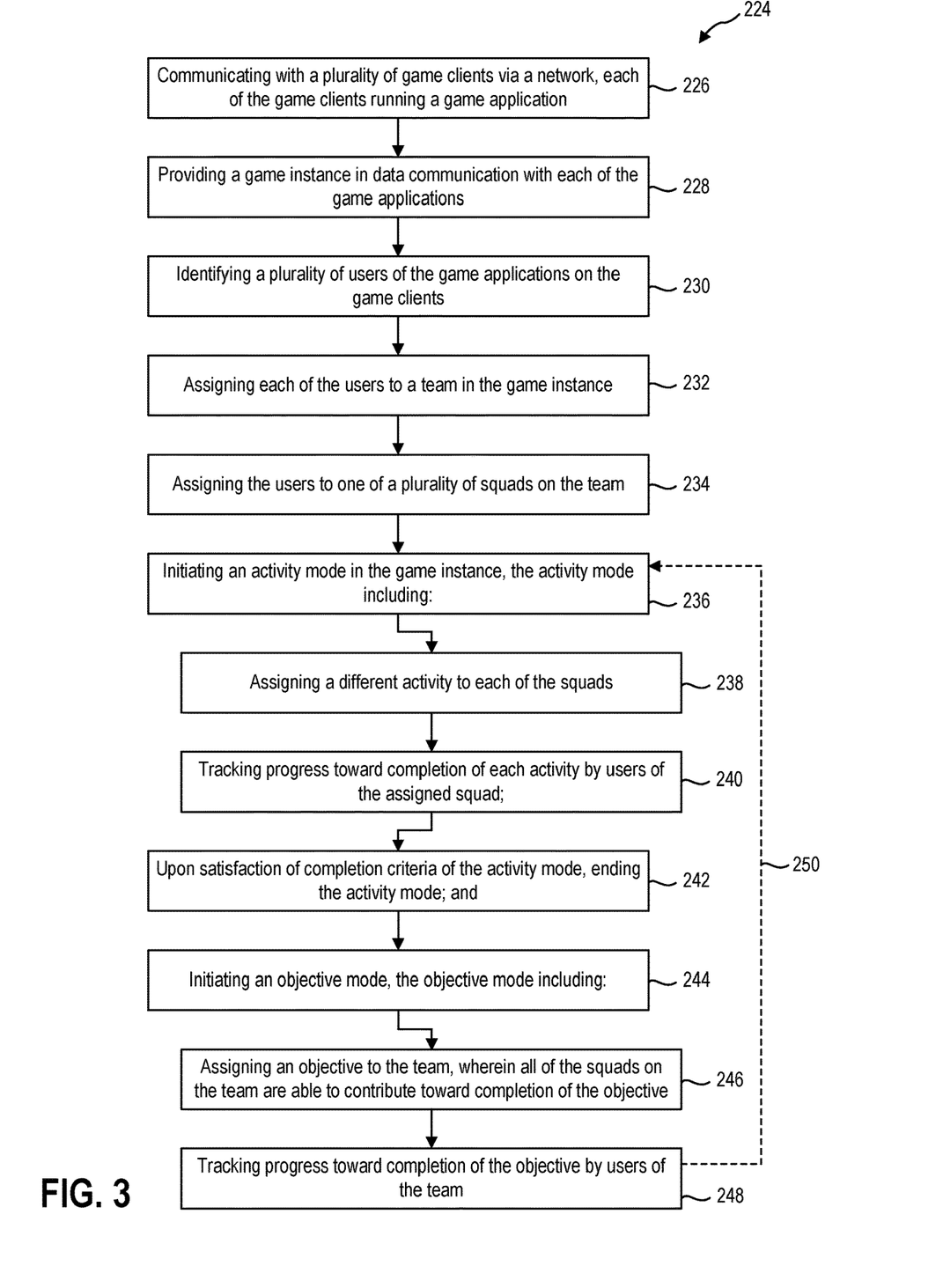
FIG. 3 is a flowchart illustrating a method of providing gameplay experiences to users, according to at least some embodiments of the present disclosure.

In some embodiments, a multiplayer gameplay mode according to the present disclosure is directed and/or provided at the server level to coordinate the game environment and experiences of the user playing on game clients. FIG. 3 is a flowchart of a general method 224 of providing a gameplay mode, according to the present disclosure. In some embodiments, a method 224 of directing and providing a multiplayer gameplay mode occurs at the server computer and includes communicating (226) with a plurality of game clients via a network, where each of the game clients is running a copy of the game application. In some examples, the game clients are local to the users playing the game application. In some examples, the game clients are remote from the users playing the game application, such as in a cloud gaming situation. A user may use a local electronic device to access a game client via a network, where the game client runs the game application and broadcasts audiovisual information to the user's local electronic device.

The method continues by providing (228) a game instance in data communication with each of the game applications running on the game clients. The game instance is initiated through communication between the game clients and the server computer. In some embodiments, the game instance is maintained and synchronized by the server computer throughout the gameplay session. In some embodiments, the game instance is initiated by the server computer, but game data is shared through a direct connection between the game clients to coordinate at least a portion of the game data of the game instance.

The method includes, in the game instance, identifying (230) a plurality of users of the game applications on the game clients and assigning (232) each of the users to a team in the game instance. In some embodiments, there is one user per game client. In some embodiments, at least one of the game clients has more than one user. For example, the method may support "couch co-op" play where more than one user joins the gameplay session from a single game client.

In some embodiments, the users are assigned to a single team. In some examples, a single team is created to compete against a computer-controlled challenge in PvE gameplay. In some embodiments, the users are assigned to two or more teams. In some embodiments, an equal number of users are assigned to each team, while in other embodiments, the teams are asymmetric. The team assignments may be based on technical information about the game instance, network, game clients, or users such as network ping or game application login time. The team assignments may be based on user or character profile information, such as user or character level, role, class, character type, skill level, prior win-loss record or other gameplay statistic. For example, a team may have less players assigned to the team when the players have higher skill levels than those of an opposing team. In other examples, a set of PvE challenges may be asymmetric, warranting asymmetric teams.

In some embodiments, the method includes assigning (234) users of the team to one squad of a plurality of squads on the team. Each team, whether the gameplay mode uses one team of users in a PvE challenge or a plurality of teams in a PvE or PvP scenario, has a plurality of squads. Each squad has at least two users assigned to the squad. In a particular example, two teams are pitted against one another in a PvP gameplay mode and each team has three squads with four users in the squad. The resulting teams have twelve users per team. In another example, three teams are pitted against one another with four squads of two users each. The resulting teams have eight users per team. In another example, a team has sixteen squads of four users for a total of 64 users on the team. The assignment for each user is communicated to the game client to inform the game client and the user the team and squad to which they are assigned.

Once all users have been assigned to teams and squads, the method further includes initiating (236) an activity mode in the game instance. Each squad is assigned (238) a different activity, and the game environment is determined by the server. The activities may be PvE or PvP activities, but the method includes tracking (240) progress toward completion of the activities by users of the assigned squad. In some embodiments, progress toward completion of a PvE or PvP activity in only credited to a team if the members of the squad assigned to the activity are responsible for the progress. For example, the activity is capturing and holding a checkpoint. In such an example, only a member of the assigned squad may capture the checkpoint by positioning the user-controlled avatar at the location of the checkpoint (or by activating an in-game object, etc.). While members of other squads may assist the assigned squad by helping combat enemy player-characters or NPCs, the presence of the other squads is not credited toward the completion of the checkpoint capture. This ensures that each squad, while free to assist others in some embodiments, feels a direct contribution to the progress of the gameplay session.

In some embodiments, the activity mode includes a plurality of activities that are different from one another to provide variety to the user experience. In some embodiments, at least one of the activities is a direct PvP activity in which a squad from a first team directly competes with a squad of a second team. In some embodiments, at least one of the activities is a PvE activity in which a squad from a first team is tasked with completing a PvE challenge to aid the first team. In some embodiments, the PvE activity is also an indirect PvP activity, pitting a squad from a first team against a squad from a second team in a race to complete the PvE challenge first or to collect more resources from the environment in a fixed period of time.

The selection of activities, creation of activities, assignment of squads to a particular activity, selection of objectives, creation of objectives, assignment of teams to a particular objective. or combinations thereof may be random or may be a smart activity selection, creation, or assignment based upon at least one gameplay mode parameter or gameplay statistic. For example, the selection of activities, creation of activities, assignment of squads to a particular activity, or combinations thereof may be based upon past activities selected and/or assigned to a squad or members of the squad. In this manner, a user or a squad of users may be presented with a variety of activities and avoid repetitive gameplay experiences.

In some examples, the selection of activities, creation of activities, assignment of squads to a particular activity, or combinations thereof may be based on past performance by the squads or users in particular activities. In a particular example, a squad may demonstrate (through completion time, efficiency, or eliminations of opposing characters) a particular skill for capturing locations in activities. Therefore, to balance the gameplay session, a second round of activities may assign a capture-the-flag gameplay format to the squad in an effort to balance the match. In another example, one or more settings or options in the activity may be altered to cater to a particular squad's strength or weakness, such as assigning to a squad an activity that allows for only sidearm usage or places an activity's target resource inside a building to limit the effectiveness of sniping or camping in response to an measurable imbalance in a previous activity.

In some examples, the selection of activities, creation of activities, assignment of squads to a particular activity, selection of objectives, creation of objectives, assignment of teams to a particular objective. or combinations thereof may be based upon time elapsed or remaining the gameplay session or based upon the duration of a previous round of activities. For example, if a first activity mode allowed for an open-ended duration and lasted 15 minutes or more, a subsequent activity mode may place a 5 minute time limit on the activity mode to move the gameplay session along. In other examples, a time limit may be indirectly imposed by reducing the collected resources needed to complete the activity. In other examples, a time limit may be indirectly imposed by limiting the resources available to users and/or squads in the activity. In some embodiments, such as an asymmetric gameplay session as will be described herein, an activity with a shorter estimated or expected duration may be selected to allow a losing team an opportunity to complete an activity mode and reenter an objective mode to catch up to an opposing team.

In some embodiments, an activity may be procedurally generated by selecting a win condition, map, and set of gameplay options or modifiers based on user performance and/or past user experiences. For example, an activity may have a resource collection win condition, a capture-the-flag win condition, a PvE win condition, a point capture win condition, a user or NPC elimination win condition, target elimination win condition, a payload or target escort win condition, a base defense win condition, or others. The activity may additionally pair the selected win condition with one of a plurality of maps, which may vary in symmetry, area, verticality, openness, resource availability, other properties, or combinations thereof to alter the strategy with which users and/or squads approach the activity.

In some embodiments, the activity mode allows for the collection or accrual of resources for the team. For example, completion of a squad's activity may be based on collection of resources from the environment. In other examples, each squad may be tasked with collecting resources and the activity mode is won by a team, as a whole, collecting a certain amount of resources. It should be understood that resources can include a broad range of in-game points, objects, or other abstract things. In some examples, the "resources" may be in-game objects the user's retrieve with their avatars. In some examples, the "resources" may be dog tags collected from enemy avatars. In some examples, the "resources" may be abstract resources that are accrued by capturing and holding control of a base or checkpoint over time. In some examples, the collected resources may provide a bonus or advantage to the users in the objective mode.

In some embodiments, winning the activity mode is related to completing a predetermined number of activities. In some embodiments, the activity mode is won when all squads on a team complete their assigned activities. For example, if all squads from a first team complete their assigned activities before all of the squads from a second team, the first team wins the activity mode. In some embodiments, the activity mode is won when the team completes a predetermined total number of activities. For example, a team with four squads may need to complete three of the four activities to win the activity mode. In some embodiments, the activity mode is won when the team completes a predetermined total number of activities and all squad complete at least one activity. For example, a team with three squads may need to complete five activities, where a new activity is assigned to a squad upon completion of the currently assigned activity.

In some embodiments, the activities are asynchronous with one another. For example, the activities occur in parallel with one another but do not have to begin or end at the same time as one another and may be completed at different times or in different orders. In some embodiments, a second squad may provide assistance to a first squad during the activity mode. For example, the first squad may be assigned an activity to capture and hold a checkpoint against an enemy squad for five minutes. The second squad may provide assistance by combating the enemy squad such that the first squad capture and hold the checkpoint. In some embodiments, the second squad is able to provide assistance to the first squad at any time during the activity mode. For example, a team may decide to dedicate both the first squad and the second squad to completing the activity assigned to the first squad, while jeopardizing or abandoning the activity assigned to the second squad. In some embodiments, the second squad is only able to provide assistance to the first squad after the second squad has completed their assigned activity (either winning or losing the activity, for example, in a PvP activity). Such limitations may provide a snowball effect on the gameplay session if the second squad completes their activity and then assists the first squad, improving the chances the team will complete or win the activity. When the first squad completes their assigned activity, both the first squad and the second squad may be free to go assist a third squad or a fourth squad of the team.

In some embodiments, a second squad may contribute toward completion of the activity assigned to a first squad during the activity mode. For example, the first squad may be assigned an activity to capture and hold a checkpoint against an enemy squad for five minutes. The second squad may contribute by being present on or at the checkpoint to capture and hold the checkpoint. In some embodiments, the second squad may contribute toward the completion, but the ultimate completion of the activity may be only possible by a member of the assigned first squad. For example, capturing the checkpoint may require being present at the location of the checkpoint without enemies present for at least 15 seconds. A member of the second squad may be able to advance a capture timer by remaining present on the checkpoint, but a member of the first squad may be required to actually capture the checkpoint. In at least one example, the timer may count up to 14.9 seconds and stop until a member of the first team arrives to capture the checkpoint.

In some embodiments, the second squad is able to contribute to the activity assigned to the first squad after the second squad has completed their assigned activity (either winning or losing the activity, for example, in a PvP activity). For example, if the activity assigned to the second squad is still active, the second squad may be allowed to assist the first squad, but the actual capturing and holding of the checkpoint must be done by the first squad until the activity assigned to the second squad is complete. This can lead to strategic decisions, such as recognizing the second squad is about to lose their assigned activity and retreating. In one example, the second squad makes a tactical decision to abandon their assigned activity and move to the checkpoint of the activity assigned to the first squad so that the second squad is already present and engaged at the checkpoint when their assigned activity is lost, greatly improving the odds of their team instead winning the activity assigned to the first squad. In other embodiments, the method includes reassigning a squad to a new activity or existing activity upon completion of their assigned activity.

The method further includes, upon satisfaction of the completion criteria of the activity mode, ending (242) the activity mode and initiating (244) an objective mode. The server sends instructions to the game clients to transition to an objective mode in which all squads of a team are assigned a single objective. The team can work together as a single unit, irrespective of squads, to make progress toward or complete the primary objective. The method includes assigning (246) an objective to the team, where all of the squads on the team are able to contribute toward completion of the objective. The method also includes tracking (248) progress toward completion of the objective by users of the team. In some embodiments, the objective is completed during the first iteration of the objective mode. In some embodiments, the team will make progress toward completion of the objective during the first iteration of the objective mode, but the team will not complete the objective until a later iteration of the objective mode. In some embodiments, progress from an earlier iteration of the objective mode is carried over to later iterations. For example, the team may destroy 50% of the enemy ship's defenses during the first objective mode, only to return to the activity mode and, after winning a second activity mode, destroy the second 50% of the enemy ship's defenses during a second objective mode.

In some embodiments, the objective mode continues for a predetermined time, such as two minutes, five minutes, ten minutes, or another duration. In some embodiments, the duration of the objective mode is related to the results of the activity mode. For example, if the first team wins five out of five activities over the second team, the first team may be the attackers during the objective mode for a longer duration than if the first team had won three out of the five objectives.

In some embodiments, the objective mode provides the team than won the activity mode a predetermined number of attempts to complete the objective mode. In some embodiments, the number of attempts allowed during the objective mode is related to the results of the activity mode. For example, if the first team wins five out of five activities over the second team, the first team may be the attackers during the objective mode with more allowed attempts (and hence the second team will have to successfully defend a greater number of time) than if the first team had won three out of the five objectives.

In some embodiments, the objective mode is symmetrical between all teams in the gameplay mode. A symmetrical objective mode is one in which the activity mode ends for all teams and all teams begin and compete in the objective mode together. In other embodiments, the objective mode is asymmetrical. For example, when the first team completes the activity mode, the first team may enter the objective mode while the second team continues in the activity mode until the second team completes the completion criteria of the activity mode. In a particular example, the activity mode may include each of four squads assigned to collect a different mineral resource from the environment. If the four squads of the first team each complete their assigned activities, the first team enters the objective mode while four squads of the second team continue collecting resources. When a team collects all of the necessary minerals, the team is able to siege the second team's base in the objective mode.

However, in an asymmetrical format, the second team remains in the activity mode, unable to attack the first team's base. The second team is presented with the tactical decision to either fall back and defend their base during the first team's objective mode, continue collecting resources to complete their activities, or a combination of the two. For example, the first squad, second squad, and fourth squad of the second team may have completed their activities, and the team is waiting for the third squad to complete their assigned activity. In some embodiments, the first squad, second squad, and fourth squad are be unable to contribute to the assigned activity of the third team, and therefore, may decide to defend their base until the third squad finishes. In other embodiments, at least one of the first squad, second squad, and fourth squad is able to contribute to the assigned activity of the third squad and accelerate completion.

In the above example, the second team has the choice to continue collecting resources or retreat to defend their base. In some embodiments, the server changes the spawn location or drop location of supplies for the users in the game environment to encourage the users to move or change their behavior during an objective mode. For example, the second team may cease to receive supply drops in the game environment at the location of the assigned activities and, instead, only receive supplies at the base to be defended. In some embodiments, the server forces a team to change location on the map during an objective mode. For example, the activities may be disabled or otherwise tolled until the first team's objective mode expires. In another example, all player avatars of the second team are moved to the base and their movement away from the base is limited to ensure they continue defending the base.

In some embodiments, after the objective mode lapses without the team completing the objective mode, the method includes returning (250) to the activity mode and initiating a second activity mode.

Figure 4:
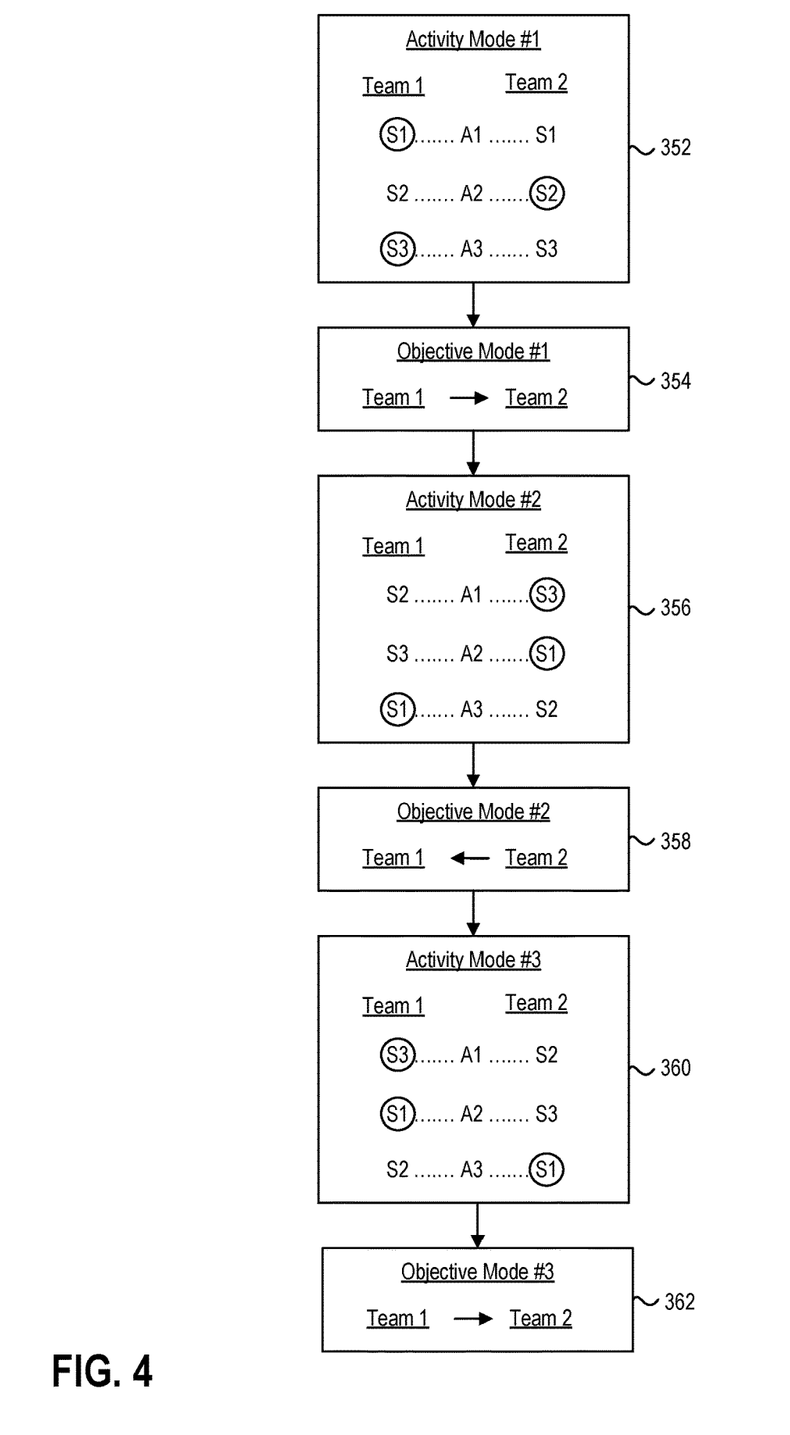
FIG. 4 is a flowchart illustrating a gameplay session, according to at least some embodiments of the present disclosure.

FIG. 4 illustrates an example of the gameplay cycle for symmetrical activity modes and objective modes. In some embodiments, the method assigns users to one of three squads per team. The first activity mode 352 pits the first squad from the first team against the first squad from the second team in a first assigned activity, the second squad from the first team against the second squad from the second team in a second assigned activity, and the third squad from the first team against the third squad from the second team in a third assigned activity. In this example, the first team wins the first activity and third activity (winners indicated by the circles), and the first team as a whole is the attacking team for the first objective mode 354 while the second team defends. Upon completion of the first objective mode 354 (either by time, attempts, or other constraint), the server instructs the game clients to return to the activity mode for a second activity mode 356.

In some embodiments, each iteration of the activity mode 352, 356, 360 uses the same activities. In some embodiments, the activities change each time the gameplay session returns to another iteration of the activity mode 352, 356, 360. The second activity mode 356 illustrates the same activities, but different squads assigned to the activities. This can ensure a variety of activities and activity types for the users and prevent repetitive gameplay. Similarly, the pairings of squads can be changed to allow users to compete against (directly or indirectly) different users in each iteration of the activity mode 352, 356, 360. For example, while the first activity mode 352 assigned the first squad of each team to the first activity, the second activity 356 mode assigns the second squad of the first team to compete against the third squad of the second team in the first activity.

In this example, the second team wins the first activity and second activity, and the second team is the attacking team for the second objective mode 358. Upon completion of the second objective mode 358 (either by time, attempts, or other constraint), the server instructs the game clients to return to the activity mode for a third activity mode 360.

In the third activity mode 360, the activity assignments and squad opponents change again to allow the users to experience all of the activities and compete against all of the users. In this example, the first team wins the first activity and second activity, and the first team is the attacking team for the third objective mode 362 while the second team defends. During the third objective mode 362, the first team completes the objective and wins the gameplay session.

Figure 5:
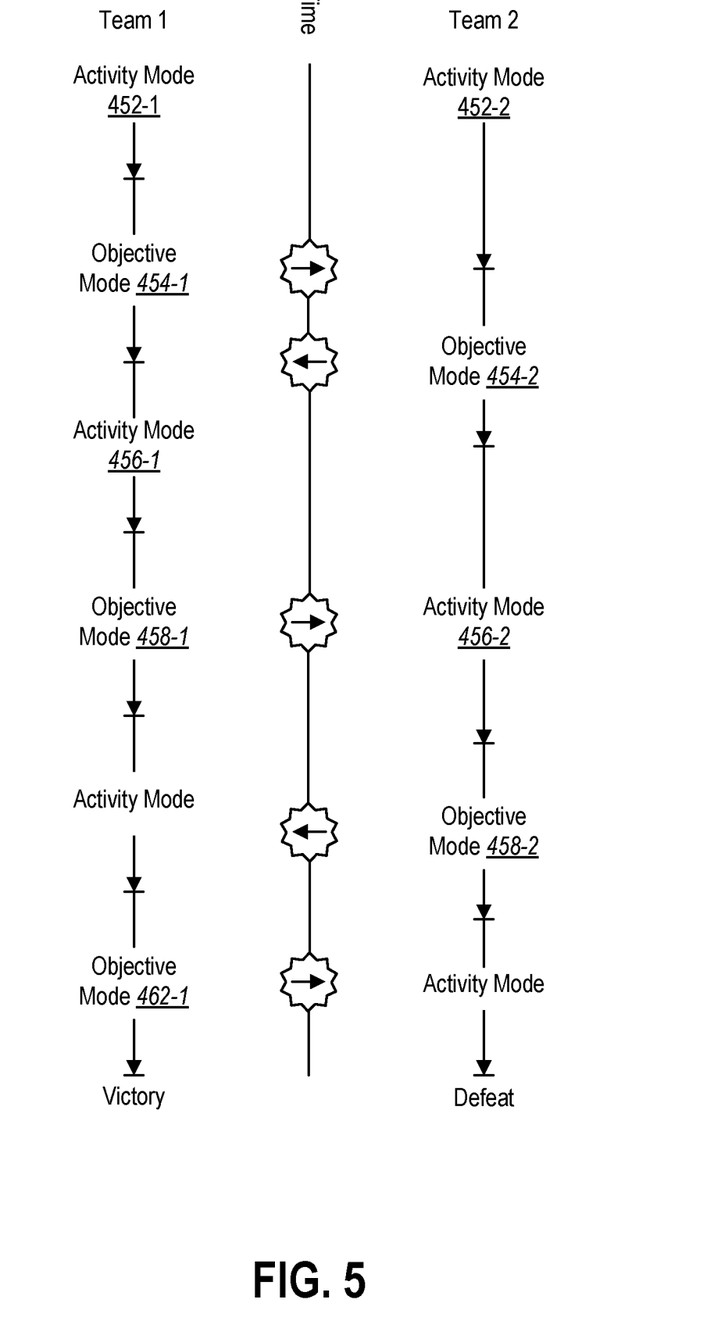
FIG. 5 is a chart illustrating a timeline of an asymmetric gameplay session, according to at least some embodiments of the present disclosure.

FIG. 5 illustrates an example of the gameplay cycle for asymmetrical activity modes and objective modes. FIG. 5 is a chart of the transitions between each iteration of the activity mode and the objective mode in an asymmetrical PvP gameplay mode according to the present disclosure. Both teams begin with individual squads in activities, such as described in relation to FIG. 4 and elsewhere in this disclosure. When a team completes the completion criteria of the first activity mode 452-1, 452-2, the team enters the first objective mode 454-1, 454-2. In the illustrated example, the first team enters the first objective mode 454-1 first and is able to attack the base of the second team while the second team is still in the first activity mode 452-2. In some embodiments, the second team has the option to retreat and defend against the first team, continue completing their assigned activities, or a combination of the two.

The second team completes their first activity mode 452-2 and transitions to their first objective mode 454-2 during the first team's objective mode 454-1, allowing the second team to counterattack the first team's base. During the second team's first objective mode 454-2, the first team's first objective mode 454-1 lapses, and the first team begins a second activity mode 456-1. This process continues as the first team begins to outpace the second team, beginning and ending a second objective mode 458-1 while the second team is still in their second activity mode 456-2. The result of the first team's pace is that the first team enters a third objective mode 460-1 before the second team completes a second objective mode 458-2, and the first team completes the objective, winning the gameplay session.

In some embodiments, a multiplayer gameplay mode according to the present disclosure provides a cyclic gameplay flow that moves users between squad-based activities and large-scale team-based objectives. The multiplayer gameplay mode provides variety to the user experience and allows users to contribute to the team's success in variety of identifiable ways. This can provide a more engaging experience for both inexperienced and experienced users, as well as those that excel in tactical gameplays decisions, mechanical gameplay skills, or both. In some embodiments, a multiplayer gameplay mode as described herein can provide PvE challenges, PvP challenges, or a combination of the two. The flexibility of the multiplayer gameplay modes described herein allow developers to adapt the multiplayer gameplay mode to narrative structure of the game application.

The present disclosure relates to systems and methods for direction of remote user interactions in an interactive computer game according to at least the examples provided in the sections below:

1. A method of providing gameplay experiences for users, the method comprising:
    at a server computer:
        communicating with a plurality of game clients via a network, each of the game clients running a game application;
        providing a game instance in data communication with each of the game applications;
        identifying a plurality of users of the game applications on the game clients;
        assigning each of the users to a team in the game instance;
        assigning the users to one of a plurality of squads on the team;
        initiating an activity mode in the game instance, the activity mode including:
            assigning a different activity to each of the squads, and
            tracking progress toward completion of each activity by users of the assigned squad;
        upon satisfaction of the completion criteria of the activity mode, ending the activity mode; and
        initiating an objective mode, the objective mode including:
            assigning an objective to the team, wherein all of the squads on the team are able to contribute toward completion of the objective, and
            tracking progress toward completion of the objective by users of the team.
2. The method of section 1, wherein the activity mode is a first activity mode and the method further comprises initiating a second activity mode after completion of a portion of the objective mode.
3. The method of section 2, wherein the second activity mode carries over the progress tracked during the first activity mode.
4. The method of any preceding section, wherein the team is a first team, and the method further comprises assigning at least some of the users to a second team.
5. The method of section 4, wherein the second team opposes the first team at least one of the active mode or objective mode.
6. The method of any preceding section, wherein only actions by or a location of users of the assigned squad contribute toward completion of the related activity.
7. The method of any preceding section, wherein the activity is completable only by a user of the assigned squad.
8. The method of any preceding section, wherein the predetermined number of activities is at least one for each activity assigned to a team.
9. The method of any preceding section, wherein a second squad of the plurality of squads is able to assist a first squad in completion of a first activity assigned to a first squad.
10. The method of section 9, wherein the second squad is able to assist the first squad after the second squad completes the assigned activity of the second squad.
11. The method of any preceding section, wherein the activities assigned to the squads are asynchronous.
12. The method of any preceding section, wherein the team includes at least 12 users.
13. The method of any preceding section, wherein the team includes at least 3 squads.
14. A method of providing gameplay experiences for users, the method comprising:
    at a server computer:
        communicating with a plurality of game clients via a network, each of the game clients running a game application;
        providing a game instance in data communication with each of the game applications;
        identifying a plurality of users of the game applications on the game clients;
        assigning each of the users to one of a plurality of teams in the game instance;
        assigning the users to one of a plurality of squads on the respective team of the plurality of teams;
        initiating an activity mode in the game instance, the activity mode including:
            assigning a different activity to each of the squads, and
            tracking progress toward completion of each activity by users of the assigned squad;
        upon satisfaction of the completion criteria of the activity mode by a first team of the plurality of teams, ending the activity mode; and
        initiating an objective mode for at least the first team, the objective mode including:
            assigning an objective to the first team, wherein all of the squads on the team are able to contribute toward completion of the objective, and
            tracking progress toward completion of the objective by users of the first team.
15. The method of section 14, wherein the objective mode further includes assigning the second team to defend the objective against the first team.
16. The method of sections 14 or 15, wherein the objective mode is a first objective mode and tracked progress from the first objective mode carries over to subsequent objective modes.
17. The method of any of sections 14-16, wherein the activity mode is a first activity mode and tracked progress from the first activity mode carries over to subsequent activity modes.
18. The method of any of sections 14-17, wherein the first team begins the objective mode and the second team remains in the activity mode during at least a portion of the objective mode of the first team.
19. A game system for providing gameplay experiences to users, the system comprising:
    a server in data communication with a network, the server including:
        one or more processors;
        a hardware storage device in data communication with the one or more processors, the hardware storage device having instructions stored thereon that, when executed by the processor cause the server to:
            communicate with a plurality of game clients via a network, each of the game clients running a game application;
            provide a game instance in data communication with each of the game applications;

identify a plurality of users of the game applications on the game clients;
assign each of the users to a team in the game instance;
assign the users to one of a plurality of squads on the team;
initiating an activity mode in the game instance, the activity mode including:
assigning a different activity to each of the squads, and
tracking progress toward completion of each activity by users of the assigned squad;
upon satisfaction of the completion criteria of the activity mode, end the activity mode; and
initiate an objective mode, the objective mode including:
assigning an objective to the team, wherein all of the squads on the team are able to contribute toward completion of the objective, and
tracking progress toward completion of the objective by users of the team.

20. The system of section 20 further comprising a display and input device that are in data communication with and remote to at least one game client of the plurality of game clients.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of providing gameplay experiences for users, the method comprising:
at a server computer:
communicating with a plurality of game clients via a network, each of the game clients running a game application;
providing a game instance in data communication with each of the game applications;
identifying a plurality of users of the game applications on the game clients;
assigning each of the users to a team in the game instance;
assigning the users to one of a plurality of squads on the team;
initiating an activity mode in the game instance, the activity mode including:
assigning a different activity to each of the squads, and
tracking progress toward completion of each activity by users of the assigned squad;
upon satisfaction of the completion criteria of the activity mode, ending the activity mode; and
initiating an objective mode, the objective mode including:
assigning an objective to the team, wherein all of the squads on the team are able to contribute toward completion of the objective, and
tracking progress toward completion of the objective by users of the team.

2. The method of claim 1, wherein the activity mode is a first activity mode and the method further comprises initiating a second activity mode after completion of a portion of the objective mode.

3. The method of claim 2, wherein the second activity mode carries over the progress tracked during the first activity mode.

4. The method of claim 2, wherein the second activity mode includes second activities selected based at least partially upon the first activity mode.

5. The method of claim 1, wherein the team is a first team, and the method further comprises assigning at least some of the users to a second team and wherein the second team opposes the first team at least one of the active mode or objective mode.

6. The method of claim 1, wherein only actions by or a location of users of the assigned squad contribute toward completion of the related activity.

7. The method of claim 1, wherein the activity is completable only by a user of the assigned squad.

8. The method of claim 1, wherein the predetermined number of activities is at least one for each activity assigned to a team.

9. The method of claim 1, wherein a second squad of the plurality of squads is able to assist a first squad in completion of a first activity assigned to a first squad.

10. The method of claim 9, wherein the second squad is able to assist the first squad after the second squad completes the assigned activity of the second squad.

11. The method of claim 1, wherein the activities assigned to the squads are asynchronous.

12. The method of claim 1, wherein the team includes at least 12 users.

13. The method of claim 1, wherein the team includes at least 3 squads.

14. A method of providing gameplay experiences for users, the method comprising:
- at a server computer:
  - communicating with a plurality of game clients via a network, each of the game clients running a game application;
  - providing a game instance in data communication with each of the game applications;
  - identifying a plurality of users of the game applications on the game clients;
  - assigning each of the users to one of a plurality of teams in the game instance;
  - assigning the users to one of a plurality of squads on the respective team of the plurality of teams;
  - initiating an activity mode in the game instance, the activity mode including:
    - assigning a different activity to each of the squads, and
    - tracking progress toward completion of each activity by users of the assigned squad;
  - upon satisfaction of the completion criteria of the activity mode by a first team of the plurality of teams, ending the activity mode; and
  - initiating an objective mode for at least the first team, the objective mode including:
    - assigning an objective to the first team, wherein all of the squads on the team are able to contribute toward completion of the objective, and
    - tracking progress toward completion of the objective by users of the first team.

15. The method of claim 14, wherein the objective mode further includes assigning the second team to defend the objective against the first team.

16. The method of claim 14, wherein the objective mode is a first objective mode and tracked progress from the first objective mode carries over to subsequent objective modes.

17. The method of claim 14, wherein the activity mode is a first activity mode and tracked progress from the first activity mode carries over to subsequent activity modes.

18. The method of claim 14, wherein the first team begins the objective mode and the second team remains in the activity mode during at least a portion of the objective mode of the first team.

19. A game system for providing gameplay experiences to users, the system comprising:
- a server in data communication with a network, the server including:
  - one or more processors;
  - a hardware storage device in data communication with the one or more processors, the hardware storage device having instructions stored thereon that, when executed by the processor cause the server to:
  - communicate with a plurality of game clients via a network, each of the game clients running a game application;
  - provide a game instance in data communication with each of the game applications;
  - identify a plurality of users of the game applications on the game clients;
  - assign each of the users to a team in the game instance;
  - assign the users to one of a plurality of squads on the team;
  - initiating an activity mode in the game instance, the activity mode including:
    - assigning a different activity to each of the squads, and
    - tracking progress toward completion of each activity by users of the assigned squad;
  - upon satisfaction of the completion criteria of the activity mode, end the activity mode; and
  - initiate an objective mode, the objective mode including:
    - assigning an objective to the team, wherein all of the squads on the team are able to contribute toward completion of the objective, and
    - tracking progress toward completion of the objective by users of the team.

20. The system of claim 1 further comprising a display and input device that are in data communication with and remote to at least one game client of the plurality of game clients.

* * * * *